T. POMIJE & J. STASKA.
THRESHING MACHINE.
APPLICATION FILED AUG. 21, 1914.
1,135,716.
Patented Apr. 13, 1915.
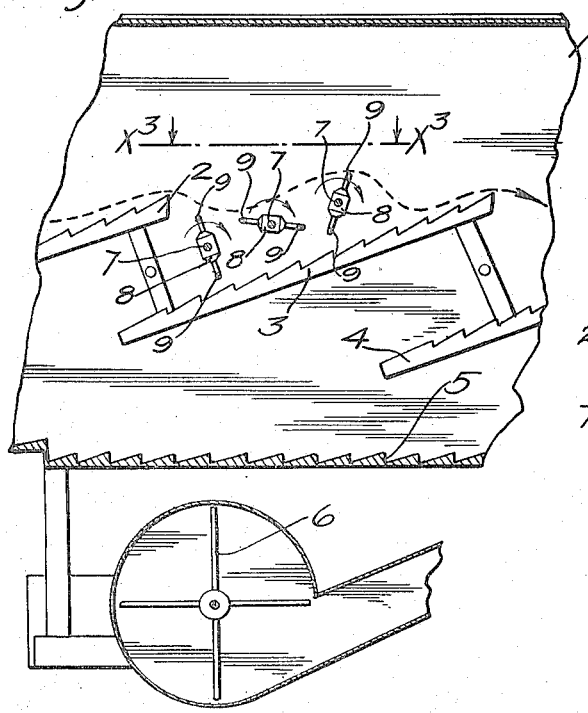
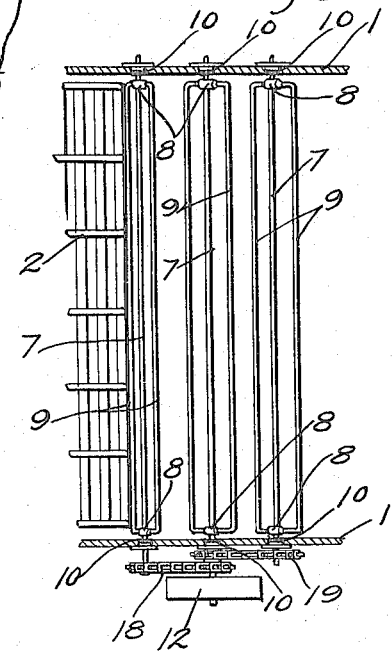
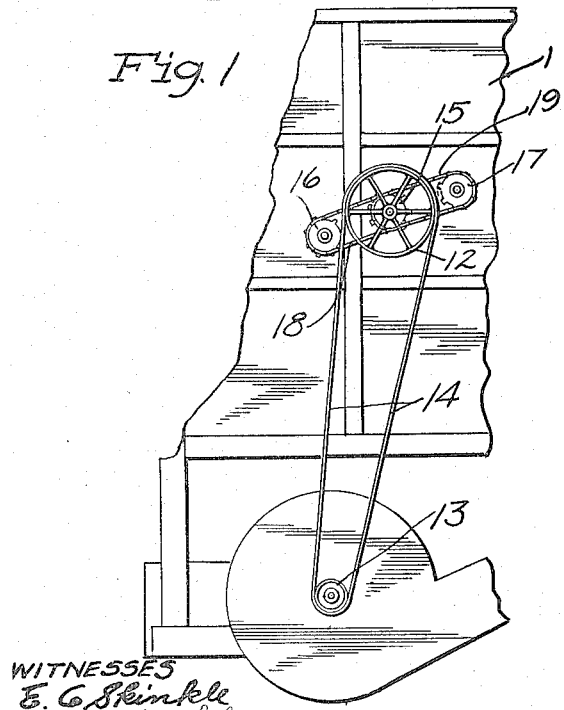
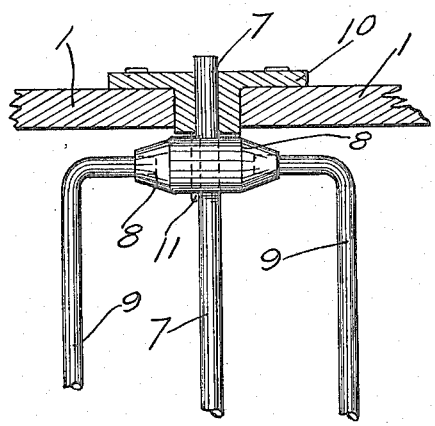
INVENTORS
Theofil Pomije
Joseph Staska
BY HIS ATTORNEYS
WITNESSES

UNITED STATES PATENT OFFICE.

THEOFIL POMIJE, OF LESUEUR CENTER, AND JOSEPH STASKA, OF MONTGOMERY, MINNESOTA.

THRESHING-MACHINE.

1,135,716.  Specification of Letters Patent.  Patented Apr. 13, 1915.

Application filed August 21, 1914. Serial No. 857,844.

*To all whom it may concern:*

Be it known that we, THEOFIL POMIJE and JOSEPH STASKA, citizens of the United States, residing at Lesueur Center and Montgomery, respectively, in the county of Lesueur and State of Minnesota, have invented certain new and useful Improvements in Threshing-Machines; and we do hereby declare the following to be a full, clear, and exact description of the invention, such as will enable others skilled in the art to which it appertains to make and use the same.

Our invention relates to threshing machines, and has for its object to provide devices for thoroughly beating or shaking the grain left in the straw after having passed between the threshing cylinder and concave and while the straw is passing over the straw racks, thus reducing to a minimum the amount of grain carried with the straw into the stack.

To the above end, generally stated, the invention consists of the novel devices and combinations of devices hereinafter described and defined in the claims.

In the accompanying drawings, which illustrate the invention, like characters indicate like parts throughout the several views.

Referring to the drawings, Figure 1 is a fragmentary view, in side elevation, of a threshing machine having incorporated therein our invention; Fig. 2 is a longitudinal section, taken centrally through the parts shown in Fig. 1; Fig. 3 is a view, partly in plan and partly in horizontal section, taken in the vicinity of the line $x^3$ $x^3$ of Fig. 2; and Fig. 4 is a detail view, on an enlarged scale, of one of the beaters, some parts being broken away.

Of the parts of the threshing machine illustrated it is only necessary to note the machine case 1, front, intermediate and rear vibratory straw racks 2, 3 and 4, respectively, grain pan 5 and fan 6. The straw racks are of well-known construction, comprising laterally spaced feed bars, having serrated or fish-back working edges, and means for vibrating the same.

In the threshing machine illustrated, the beaters, as shown, three in number, are set one in advance of the other and located directly above the intermediate straw rack 3, in a plane parallel to and intermediate between said front and intermediate straw racks. Each of these beaters comprises a horizontal shaft 7 extended transversely of the machine, a pair of heads 8, and a pair of bars 9. The shaft 7 is journaled in bearings 10 secured to the side walls of the machine case 1. The heads 8 are intermediately bored to receive the shaft 7 and are secured for rotation therewith by keys 11. The bars 9 are, as shown, preferably in the form of round rods located diametrically opposite one another and having their end portions bent laterally inward and anchored in the heads 8. To secure the bars 9 to the heads 8 said heads may be cast around the ends of said rods or secured thereto in any other suitable way. Obviously, a beater constructed as described is a flat, open structure through which the loose grain may drop. By making the rods 9 round the same are less liable to strike and throw the grain.

The three beaters are arranged to deliver one to the other and are set for rotation on their own axes progressively one ahead of the other, or, in other words, 120 degrees apart. The following connections are provided for rotating the beaters in the same direction, and for keeping the said beaters in the same relative, angular positions in which they were originally set, to-wit: Keyed to the outer projecting end of the intermediate beater is a relatively large pulley 12, alined with a relatively small pulley 13 on the shaft of the fans 6, and over which pulleys runs a belt 14. Also keyed to the shaft of the intermediate beater between the case 1 and pulley 12 is a pair of sprocket wheels 15, one of which is alined with a sprocket wheel 16, on the front beater, and the other of which is alined with a sprocket wheel 17, on the rear beater. A sprocket chain 18 runs over the sprocket wheel 16 and alined sprocket wheel 15, and a second sprocket chain 19 runs over the sprocket wheel 17 and alined sprocket wheel 15. These connections are arranged to rotate said beaters in the direction of the arrows marked on Fig. 2.

When the machine is in action, the straw is delivered from the front rack 2 onto the front beater. This beater tosses the straw into the air and onto the intermediate beater, from which it is again tossed into the air and onto the rear beater. From the rear beater the straw is again tossed into the air and onto the intermediate straw rack 3. In setting the beaters in different angular positions, one ahead of the other, the straw is passed from one to the other in a wave-like course, as indicated by dotted lines in Fig. 2. While the straw is being repeatedly tossed into the air by the beaters, the loose grain held therein, being heavier than the straw, will be more quickly precipitated, dropping through or between the beaters before said grain can be again caught in the body of the straw. The straw cannot pass between or through the beaters, but will be repeatedly tossed upward thereby and thoroughly agitated to remove the loose grain therefrom, and evenly spread out over the full length of the beaters, and delivered thereby onto the rear straw rack. It is, of course, understood that one or more of these beaters may be used in a machine, and their relative positions with respect to the straw racks may be varied, depending on the construction of the machine to which they are applied.

The above described device has been thoroughly tested in actual usage, and in a full-sized machine, proving highly efficient for the purpose had in view.

What we claim is:

1. In a threshing machine, the combination with vibratory straw racks, adapted to deliver one to the other, of a plurality of flat, rotary beaters, arranged for action on the straw at a point where it passes from one straw rack to the other, said beaters being arranged to deliver one to the other and set for rotation on their own axes progressively one ahead of the other, whereby the straw is carried on said beaters, from one of said racks to the other, in a wave-like course.

2. In a threshing machine, the combination with vibratory straw racks, adapted to deliver one to the other, of a plurality of flat, rotary beaters, arranged for action on the straw at a point where it passes from one straw rack to the other, said beaters being arranged to deliver one to the other, and set for rotation on their own axes progressively one ahead of the other, whereby the straw is carried on said beaters, from one of said racks to the other, in a wave-like course and means for rotating said beaters, whereby, under their rotary speed, they are kept in the same relative angular positions in which they were initially set.

In testimony whereof we affix our signatures in presence of two witnesses.

THEOFIL POMIJE.
JOSEPH STASKA.

Witnesses:
J. H. KAISUSATT,
J. H. SMULAN.

Copies of this patent may be obtained for five cents each, by addressing the "Commissioner of Patents, Washington, D. C."